United States Patent Office 3,066,133
Patented Nov. 27, 1962

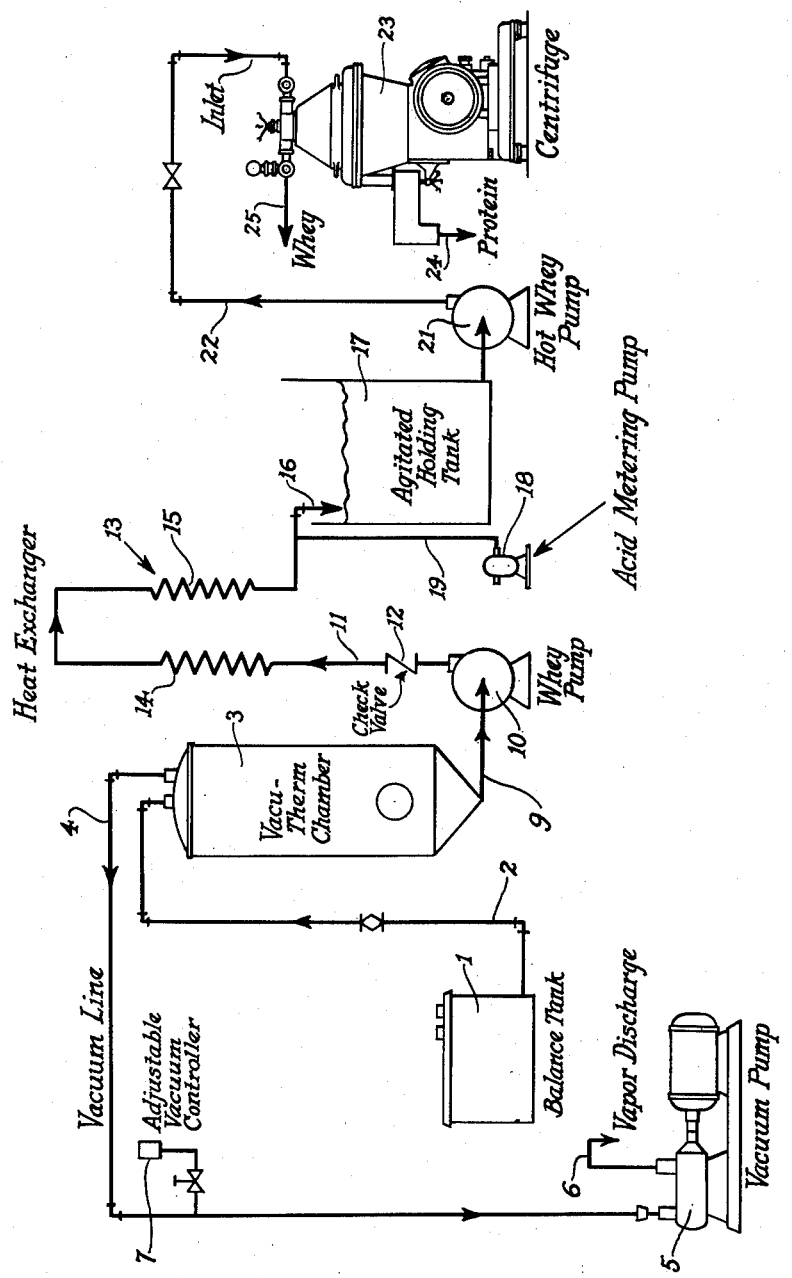

3,066,133
REMOVAL OF PROTEIN FROM CHEESE WHEY
Milton Webster Pinckney, Wappingers Falls, N.Y., assignor to The De Laval Separator Company, Poughkeepsie, N.Y., a corporation of New Jersey
Filed Apr. 15, 1959, Ser. No. 806,684
5 Claims. (Cl. 260—120)

This invention relates to the removal of heat-coagulable protein from whey, such as the whey obtained as a by-product in the production of Cheddar cheese, cottage cheese and other types of cheese. The invention has particular reference to an improved method by which such protein can be removed from the whey in a substantially continuous manner.

The removal of heat-coagulable protein from whey is desirable for several reasons. First, it reduces the biochemical oxygen demand of the whey and the tendency toward bacteriological growth, thereby reducing the pollutant character of the whey so that it can be disposed of more readily, as in streams. Secondly, it permits more efficient use of equipment such as condensing pans and dryers when the whey is to be condensed or concentrated. Also, if lactose is to be derived from the whey, a purer form of effluent is obtained for the final processing for lactose. Finally, the protein, if sufficiently concentrated, is valuable as a protein supplement for animal feeds and possibly as a dietary supplement for humans.

Heretofore, considerable difficulties have been encountered in attempting to remove protein from whey on a commercial scale. A serious difficulty stems from the fact that in heating the whey to effect coagulation of the protein, the coagulated protein has had a strong tendency to "cook on" to the heater and form deposits, so as to make continuous processing impossible or impractical. Also, it has not been possible heretofore, so far as I am aware, to separate the heat-coagulated protein efficiently and continuously from the whey and with the protein in the desired concentration, for example, about 25% total solids.

The principal object of the present invention, therefore, is to provide for removal of heat-coagulable protein from whey by a continuous method which overcomes the above-noted difficulties.

According to the invention, the whey is subjected to a vacuum treatment to remove entrained and spontaneous gases, and the degassed whey is passed through a heating zone where it is heated to a temperature in the order of 200° F. to coagulate the proteins. The heated mixture of whey and coagulated proteins is then fed, at approximately the temperature above noted, to a centrifugal separator or locus of centrifugal force where the coagulated proteins are separated from the whey, the latter being discharged continuously from the centrifugal locus. For best concentration of the separated protein, the mixture from the heating zone is passed to a holding zone where it is held for a sufficient time to precipitate coagulated protein, thereby facilitating its separation from the whey in the subsequent centrifuging step. Preferably, the mixture is held in the holding zone at a titratable lactic acid acidity of at least about 0.17% to hasten the precipitation.

I have discovered that by the afore-mentioned degassing of the whey, as by feeding it through a vacuum chamber, the whey can then be heated to the desired protein-coagulating temperature (about 200° F.) without effecting the usual rapid clogging of the heater. In fact, when heating the whey by means of a plate heat exchanger, I have found that the degassed whey can be fed continuously through this type of heater for about six hours without formation of deposits sufficient to reduce the heating efficiency appreciably.

Preferably, the whey is passed at a temperature of about 100° F. through the vacuum chamber, where a vacuum of about 20 to 25 inches Hg is maintained, and is then passed through a plate heat exchanger having three heating sections. The first is a primary heating section where the whey is heated to about 150° F., and the other two are secondary heating sections which are used alternately to heat the whey rapidly to about 200° F. That is, the whey from the primary heating section is passed through only one of the secondary sections until an appreciable deposit of protein is formed in it, as may occur in six hours or so, and then the whey from the primary section is passed through the other secondary section while the first one is being cleaned, as by circulating a cleaning solution through it.

For a better understanding of the invention, reference may be had to the accompanying drawing, in which the single illustration is a schematic view of a preferred system for use in practicing the new method.

Referring to the drawing, the fresh cheese whey is supplied to a balance tank 1 where it is preferably held at a temperature of about 100° F. From the tank 1, the whey is drawn through a pipeline 2 into a vacuum chamber 3. The latter is preferably maintained under a vacuum of 20–25 inches Hg, and for this purpose it is connected at the top through a vacuum line 4 to a vacuum pump 5 having a vapor discharge line 6. The degree of vacuum in the chamber 3 may be controlled automatically by any conventional means, such as the adjustable vacuum controller 7. Preferably, the vacuum chamber 3 contains a series of baffles (not shown) over which the whey entering this chamber flows from the top to the bottom of the chamber.

It will be understood that the whey is drawn from the balance tank 1 into the chamber 3 by the vacuum maintained in this chamber. As the whey flows downward through the chamber 3, entrained and spontaneous gases are withdrawn from the whey and through the vacuum line 4 to the suction pump 5, from which the vapors are discharged through the line 6.

The degassed whey at the bottom of chamber 3 is withdrawn from the chamber through a suction line 9 leading to a centrifugal pump 10. From the high pressure side of the pump 10, the whey is delivered to a pipeline 11 containing a check vale 12. The pipeline 11 leads to a heating zone shown generally at 13. The latter is preferably constituted by a plate type of heat exchanger having a primary heating section 14 and a secondary heating section 15 each formed by the usual series of heat exchange plates, it being understood that heat from the steam or other heating medium flowing along one side of each plate is conducted through the plate to the whey flowing along the other side. In the primary section 14, the whey is heated to about 150 F., and in the secondary section 15 the whey is heated to about 200° F. As previously described, the heat exchanger is preferably provided with an additional secondary heating section (not shown) identical to the section 15 and through which the whey from the primary section 14 can be shunted while the section 15 is being cleaned.

From the heating zone 13, the whey is delivered through a pipe 16 into a tank 17, constituting a holding zone. The tank 17 preferably has sufficient capacity to hold the whey for about 15–20 minutes before it is discharged from the bottom of the tank, as will be described presently. During this holding period, the heat-coagulated protein is precipitated in the whey so as to facilitate the subsequent separating step. In order to effect a sharp and rapid precipitation of the coagulated protein, the whey in the tank 17 should have a titratable lactic acid acidity of at least about 0.17%, perferably more. Therefore, in cases where the natural lactic acidity of the whey is less than this amount, I prefer to acidulate the whey, as with dilute acetic acid, so as to bring the acidity up to the aforementioned value. For this purpose, I provide an acid metering pump 18 which delivers the acid at the required rate through a pipe 19 into the pipe 16. Preferably, the holding tank 17 is provided with a suitable agitating device (not shown) so that the whey is subjected to mild agitation during the holding period, thereby preventing undue settling of the coagulated protein as it is precipitated.

The mixture of whey and coagulated protein passes from the bottom of tank 17 to a pump 21 which delivers the mixture through a pipeline 22 into a centrifugal separator 23, which may be termed a locus of centrifugal force. In the centrifugal bowl of the separator 23, the coagulated protein is separated as a heavier component from the whey, the latter being discharged continuously from the separator through outlet 24. The protein component is discharged through an outlet 25 of the separator. I prefer to use a separator 23 of the type in which the bowl outlet for the heavier component is automatically opened and closed periodically, whereby the separated protein component accumulating in the outer part of the bowl is intermittently discharged from the bowl. Centrifugal bowls of this type are well known in the art, an example being disclosed in Patent No. 2,378,778, dated June 19, 1945. One centrifuge of this type is known in the trade as the "Self-opening Separator, Type PX 209–00F."

By the practice of this preferred form of the new method, the whey can be processed continuously for at least several hours without any appreciable deposit of heat-coagulated protein on the surfaces of the heater 13, and the separator 23 can effect discharge of a separated protein component testing about 25% total solids and 75% moisture. When a heater 13 of the type described is used, it is desirable to maintain a relatively low differential between the temperature of the heating medium and the whey, particularly in the secondary or final heating section 15. Preferably, in the primary heating section 14 there is no more than a 5° F. temperature differential between the heating medium and the final temperature of the whey as it leaves this primary section, and in the secondary section 15 there is no more than a 2° F. temperature differential between the heating medium and the final temperature of the whey leaving this section.

*Example*

Cheese whey having the following analysis was treated according to the preferred practice of the invention as described above:

| | Percent by weight |
|---|---|
| Moisture | 93.02 |
| Dry solids | 6.98 |
| Ash 600° C. | .777 |
| Lactose | 3.76 |
| Casein | .63 |
| Albumin | .21 |

The separated whey component from outlet 25 and the separated protein component from outlet 24 had the following analyses, the figures representing percentages by weight:

| | Separated Whey Component | Separated Protein Component |
|---|---|---|
| Moisture | 93.04 | 74.38 |
| Dry solids | 6.36 | 25.62 |
| Ash, 600° C. | .534 | .534 |
| Lactose | 3.60 | 3.86 |
| Casein | .28 | 15.24 |
| Albumin | .16 | 6.62 |

I claim:

1. A method for removing heat-coagulable protein from cheese whey, which comprises flowing a stream of the whey through a vacuum chamber while maintaining in said chamber a vacuum sufficient to remove gases from the whey, passing the de-gassed whey through a heating zone and there heating the whey to a temperature of about 200° F. to coagulate protein in the whey, passing the heated mixture of whey and coagulated protein at approximately said temperature from the heating zone to a holding zone and there precipitating coagulated protein, feeding the mixture of whey and coagulated protein at approximately said temperature from said holding zone to a locus of centrifugal force and there separating the whey from the cogulated protein, and continuously discharging the separated whey from said locus.

2. A method according to claim 1, comprising also the step of intermittently discharging coagulated protein from said locus.

3. The method according to claim 1, in which the mixture in said holding zone is held at a titratable lactic acid acidity of at least about 0.17% to precipitate coagulated protein, before feeding the mixture to the locus of centrifugal force.

4. The method according to claim 1, in which a vacuum of about 20–25 inches Hg is maintained in said vacuum chamber.

5. The method according to claim 1, in which the whey is passed through said vacuum chamber at a temperature in the order of 100° F.

References Cited in the file of this patent

UNITED STATES PATENTS

| 1,381,605 | Weimar | June 14, 1921 |
| 2,118,252 | Kraft | May 24, 1938 |
| 2,188,908 | Lavett | Feb. 6, 1940 |
| 2,494,148 | Truce | Jan. 10, 1950 |
| 2,521,853 | Josh et al. | Sept. 12, 1950 |